United States Patent [19]
Maxey

[11] 3,849,014
[45] Nov. 19, 1974

[54] EXPANDABLE HUB LOCKING ASSEMBLY
[75] Inventor: Joel W. Maxey, Detroit, Mich.
[73] Assignee: Ford Motor Company, Dearborn, Mich.
[22] Filed: Dec. 5, 1972
[21] Appl. No.: 312,412

[52] U.S. Cl. ............................................. 403/370
[51] Int. Cl. ............................................ F16b 2/04
[58] Field of Search ........... 403/355, 356, 358, 365, 403/367, 368, 370, 371

[56] References Cited
UNITED STATES PATENTS

| | | | |
|---|---|---|---|
| 2,676,849 | 4/1954 | Houck et al. | 403/356 X |
| 2,691,541 | 10/1954 | Benedek | 403/370 |
| 2,814,515 | 11/1957 | Knudsen | 403/370 X |
| 2,946,611 | 7/1960 | Moyer | 403/356 |
| 2,994,548 | 8/1961 | McGogy | 403/356 |
| 3,656,785 | 4/1972 | Lothar | 403/370 |

Primary Examiner—Werner H. Schroeder
Attorney, Agent, or Firm—Clifford L. Sadler; Keith L. Zerschling

[57] ABSTRACT
The present disclosure relates to an expandable hub assembly constructed to provide a locking connection between two members such as a shaft and the smooth bore of a pulley. The expandable hub assembly includes inner and outer annular hub parts which have slidably engaging frustoconical surfaces. The hub parts each have axial slits to accommodate radial contraction and expansion. Three intermediate members interconnect the two hub parts. Each intermediate member has a coarse screw thread portion which engages a threaded hole in the inner hub part and a fine screw thread portion that engages a threaded hole in the outer part. Rotation of the intermediate members will produce relative axial displacement between the two hub parts as a result of the differential in the pitch of the screw threads. This axial movement, in combination with the sliding engagement of the frustoconical surfaces, will produce radial contraction and expansion of the inner and outer hub parts into gripping engagement with the shaft and the bore of the pulley. The radial movement of the hub parts will also cause the intermediate threaded members to be distorted and this deformation will produce forces that resist accidental disassembly of the expandable hub that might otherwise result from normal machinery vibration.

8 Claims, 4 Drawing Figures

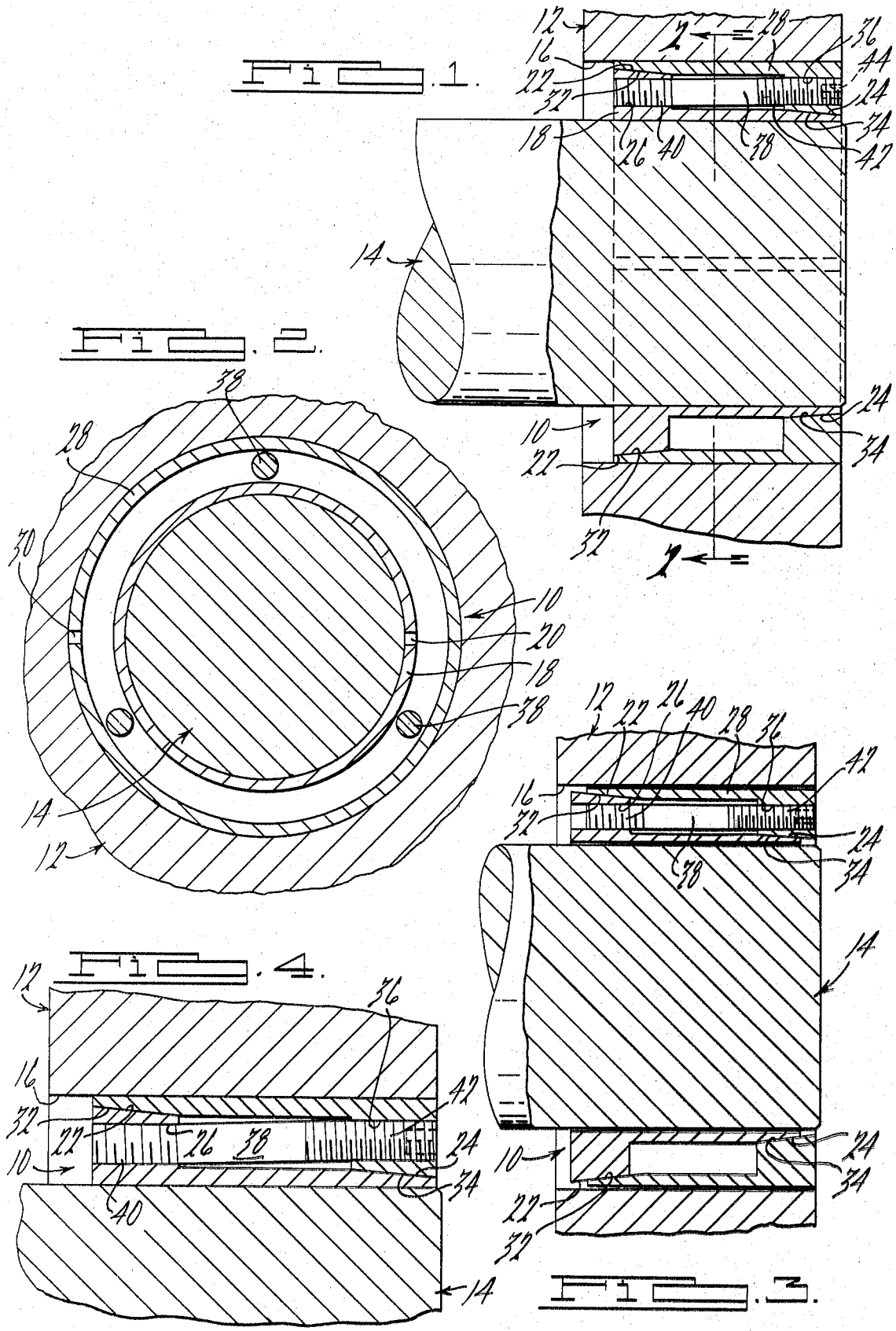

EXPANDABLE HUB LOCKING ASSEMBLY

BACKGROUND OF THE DISCLOSURE

The present invention relates to means for interconnecting two members such as a pulley and a shaft. According to the prior art, keyways are machined in the shaft and on the surface of the bore of the pulley. The keyways are aligned and a solid key inserted into the opening defined by the keyways. A radially extending threaded hole is situated in the hub of the pulley and a set screw is secured in the hole against the solid key to lock it in position in the keyways.

In accordance with the present invention, the machining of the keyways and the forming of the threaded hole for the set screw is eliminated.

BRIEF DESCRIPTION OF THE DISCLOSURE

In accordance with the presently preferred embodiment of this invention, an expandable hub assembly provides a driving connection between a pulley and a shaft. The shaft, such as the shaft of a motor, has a smooth exterior surface without a keyway slot machined therein. The pulley has a smooth bore without a keyway formed in its surface. The expandable hub assembly is interposed and secured between the shaft and the bore of the pulley to lock the pulley to the shaft.

The expandable hub assembly comprises inner and outer hub parts each of annular shape but having an axial split to permit radial contraction and expansion. The inner and outer hub parts have pairs of outwardly and inwardly facing frustoconical surfaces, respectively. The surfaces of the inner hub part slidably engage the surfaces of the outer hub part.

Three threaded intermediate members interconnect the inner and outer hub parts. The inner hub part has three holes with coarse screw threads that are engaged by coarse threads formed on one end of each of the intermediate members. The outer hub part has three holes with fine screw threads that are engaged by fine threads on the other ends of the intermediate members. Rotation of the intermediate members will produce axial displacement between the inner and outer hub parts due to the differential in the pitch of the fine and coarse threads.

Axial displacement of the hub parts will, in turn, produce radial contraction and expansion of the inner and outer hub parts, respectively, due to the interengagement of the frustoconical surfaces. The split in the inner hub part will permit it to contract and the slit in the outer hub part will permit it to expand. The contraction and expansion of the inner and outer hub parts will cause the hub assembly to grip the shaft and the wall of the bore of the pulley.

The radial displacement of the inner and outer hub parts will cause the intermediate threaded members to be bent and this deflection will produce a self-locking action. The deformation of the intermediate members will produce forces which will prevent the accidental disassembly of the expandable hub that might otherwise result from normal machinery vibration.

BRIEF DESCRIPTION OF THE DRAWINGS

The many objects and advantages of an expandable hub locking assembly in accordance with this invention will become apparent upon consideration of the following detailed discussion and the accompanying drawings, in which:

FIG. 1 is a side elevational view, partly in section, of a shaft member, a pulley member and an expandable hub assembly interconnecting said members;

FIG. 2 is a sectional view taken along section lines 2—2 of FIG. 1;

FIG. 3 is a side elevational view, partly in section, of the shaft member, the pulley member and the expandable hub prior to its expansion; and FIG. 4 is an enlarged sectional view corresponding to FIG. 3 and showing the expandable hub in its expanded condition locking the pulley to the shaft.

DETAILED DESCRIPTION OF THE PREFERRED EMBODIMENT

Referring now to the drawings, wherein the presently preferred embodiment of this invention is shown, FIG. 1 illustrates an expandable hub assembly 10 securing a pulley 12 to a shaft 14. The expandable hub assembly 10 is of unique construction and is adapted to connect the pulley 12 having a smooth internal bore 16 to the shaft 14, such as a shaft of an electric motor, which has a smooth exterior surface. Neither the surface of the bore 16 or the surface of the shaft 14 is provided with a keyway.

The expandable hub assembly 10 includes an inner hub part 18 of generally annular construction with a single axially extending slit 20. The inner hub part has spaced apart, outwardly facing, frustoconical surfaces 22 and 24. The inner hub part 18 has an enlarged end with three circumferentially spaced holes 26. The holes 26 are provided with screw threads of relatively coarse pitch.

An outer hub part 28 is of annular shape and is provided with an axial slit 30. The outer hub part 28 has spaced apart, radially inwardly facing frustoconical surfaces 32 and 34. The outer hub part 28 has one enlarged end with three circumferentially spaced apart holes 36. The three holes 36 are tapped to have screw threads of relatively fine pitch.

Three rod-like intermediate members 38 interconnect the inner and outer hub parts 18 and 28. Each intermediate member 38 has one end 40 with relatively coarse screw threads that threadedly engage the holes 26 of the inner hub part 18. Fine threads 42 are provided on the other end of the intermediate members 38 which threadedly engage the holes 36 of the outer hub part 28. Each intermediate member 38 is provided with a hexagonal socket 44 constructed to receive the end of an Allen wrench.

OPERATION

Prior to installation of the expandable hub 10, the intermediate members 38 are first threaded into the holes 36 of the outer hub 28. The inner hub part 18 is then fitted within the outer hub part 28 with its frustoconical surfaces 22 and 24 in slidable engagement with the frustoconical surfaces 32 and 34 of the outer part 28. The slit 20 of the inner hub part 18 is arranged 180° out of phase with the slit 30 of the outer hub part 28. With the two hub parts 18 and 28 together, the intermediate members 38 are screwed into the bores 26 of the inner hub part 18 to complete the assembly.

The expandable hub assembly 10 is then inserted within the bore 16 of the pulley 12 and onto the shaft 14 as seen in FIG. 3. It will be noted that radial clearance is provided between the hub assembly 10 and the shaft 14 and between the hub 10 and the bore 16.

The intermediate members 38 are then tightened by an Allen wrench. The differential in the pitch of the threaded portions 40 and 42 of the intermediate members 38 will produce relative axial displacement of the inner and outer hub parts 18 and 28. The three intermediate threaded members 38 are rotated in a progressive manner and a small amount at each time to produce even axial displacement.

The relative axial movement of the two hub parts 18 and 28 will cause the inner part 18 to contract radially and the outer part 28 to expand radially due to the inclination of the frustoconical surfaces 22, 32 and 24, 34 which are in slidable engagement. As the inner hub part 18 contracts, the gap at the slit 20 will close. Similarly, as the outer hub part 28 expands the gap at the slit 30 will increase.

As the inner and outer hub parts 18 and 28 contract and expand, respectively, they will engage the shaft 14 and bore 16 of pulley 12 (see FIG. 4). Due to the differential in the pitch of the threaded portions 40 and 42, substantial mechanical advantage will be available for drawing the hub parts 18 and 28 together and expanding them into tight gripping engagement with the shaft 14 and pulley 12.

It will be noted as the outer hub part 28 expands radially outwardly and the inner hub part 18 contracts radially inwardly, the threaded holes 26 and 36 will be displaced from an originally aligned position to a subsequent misaligned position (see FIG. 4). In the misaligned position the threaded ends 40 and 42 of the intermediate members 38 will be deflected and this elastic deformation of the intermediate members 38 will produce locking forces whereby the components of the expandable hub 10 will not be inadvertently separated due to the normal vibration of the machinery associated with the pulley 12 and the shaft 14. The hub can be readily disassembled, however, by inserting an Allen wrench into the sockets 42 and counterrotating the intermediate members 38.

In summary, this invention provides a means for connecting a pulley to a shaft that is characterized by its simplicity of construction and operation. With this assembly, economies are realized because keyways need not be machined in the hub of the pulley or on the shaft of the motor. The construction is particularly unique in that the threaded intermediate members serve the dual function of drawing the inner and outer hub parts together and producing a self-locking force resulting from their elastic deformation.

The foregoing description presents the presently preferred embodiment of this invention. Modifications and alterations may occur to those skilled in the art that will come within the scope and spirit of the following claims.

I claim:

1. An expandable hub constructed to secure a first member having an external cylindrical surface, said expandable hub comprising inner and outer hub parts, said hub parts having cooperating frustoconical surfaces, means constructed to produce relative axial displacement between said inner and outer hub parts and concomitant radial contraction and expansion of said parts, respectively, said means including a threaded member threadedly engaging both said inner and outer hub parts, said threaded member being rotatable to produce axial displacement of said inner hub part relative to said outer hub part.

2. An expandable hub assembly according to claim 1 and including:

said inner and outer hub parts being of substantially annular construction.

3. An expandable hub assembly constructed to secure a first member having an internal cylindrical surface to a second member having an external cylindrical surface, said expandable hub assembly comprising an inner hub part having an outwardly facing frustoconical surface, an outer hub part having an inwardly facing frustoconical surface, said frustoconical surface of said inner hub part slidably engaging said frustoconical surface of said outer hub part, said inner hub part having a cylindrical surface constructed to engage said external surface of said second member, said outer hub part having a cylindrical surface constructed to engage the internal surface of said first member, said inner hub part having a series of circumferentially spaced apart threaded holes, said outer hub part having a series of circumferentially spaced apart threaded holes, said holes of said outer hub part being normally aligned with said holes of said inner part, threaded intermediate members threadedly engaging said holes of said inner hub part and said holes of said outer hub parts, said intermediate members being constucted to be rotated to draw said inner and outer hub parts together whereby said frustoconical surfaces cause the radial contraction and expansion of said inner and outer parts, respectively, into engagement with said first and second members, said inner hub part and said outer hub part being constructed to cause the elastic deformation of said intermediate members in response to said contraction and expansion of said parts whereby forces are produced which tend to prevent the accident disassembly of said hub assembly that might otherwise result from vibration.

4. An expandable hub assembly according to claim 3 and including:

said inner and outer hub parts being of generally annular construction.

5. An expandable hub assembly constructed to secure a first member having an internal cylindrical surface to a second member having an external cylindrical surface, said expandable hub assembly comprising an inner hub part having an outwardly facing frustoconical surface, an outer hub part having an inwardly facing frustoconical surface, said frustoconical surface of said inner hub part slidably engaging said frustoconical surface of said outer hub part, said inner hub part having a cylindrical surface constructed to engage said external surface of said second member, said outer hub part having a cylindrical surface constructed to engage the internal surface of said first member, said inner hub part having a series of circumferentially spaced apart holes, said outer hub part having a series of circumferentially spaced apart holes, said holes of one of said hub parts having screw threads with a coarse pitch;

said holes of the other of said hub parts having screw threads with a fine pitch;

said holes of said outer hub part being normally aligned with said holes of said inner part, threaded intermediate members engaging said holes of said inner hub part and said holes of said outer hub parts, said intermediate members each having a tool receiving portion adapted to permit the use of a tool to cause the rotation of said intermediate members, said intermediate members being constructed to be rotated to draw said inner and outer hub parts together whereby said frustoconical surfaces cause the radial contraction and expansion of said inner and outer parts, respectively, into engagement with said first and second members, said inner hub part and said outer hub part being constructed to cause the elastic deformation of said intermediate members in response to said contraction and expansion of said parts whereby forces are produced which tend to prevent the accident disassembly of said hub assembly that might otherwise result from vibration.

6. An expandable hub assembly according to claim 3 and including:

said inner hub part having an enlarged portion with a first outwardly facing frustoconical surface;

said inner hub part having a thinner portion with a second outwardly facing frustoconical surface;

said outer hub part having an enlarged portion with a first inwardly facing frustoconical surface;

said outer hub part having a thinner portion with a second inwardly facing frustoconical surface;

said first frustoconical surface of said inner hub part slidably engaging said second frustoconical surface of said outer hub part;

said second frustoconical surface of said inner hub part slidably engaging said first frustoconical surface of said outer hub part.

7. An expandable hub assembly constructed to secure a first member having an internal cylindrical surface to a second member having an external cylindrical surface, said expandable hub assembly comprising an inner hub part having spaced apart and outwardly facing frustoconical surfaces, an outer hub part having spaced apart and inwardly facing frustoconical surfaces, said frustoconical surfaces of said inner hub part slidably engaging said frustoconical surfaces of said outer hub part, said inner hub part having a cylindrical surface constructed to engage said external surface of said second member, said outer hub part having a cylindrical surface constructed to engage the internal surface of said first member, said inner hub part having an enlarged portion with circumferentially spaced apart holes, said holes of said inner hub part having internal screw threads, said outer hub part having an enlarged portion with circumferentially spaced apart holes, said holes of said outer hub part having internal screw threads, said holes of said outer hub part being normally aligned with said holes of said inner part, threaded intermediate members threadedly engaging said holes of said inner hub part and said holes of said outer hub parts, the holes of one of said hub parts having threads with a coarser pitch than the threads of the holes of the other of said hub parts, said intermediate members each having a tool receiving portion adapted to permit the use of a tool to cause the rotation of said intermediate members, said intermediate members being constructed to be rotated to draw said inner and outer hub parts together whereby said frustoconical surfaces cause the radial contraction and expansion of said inner and outer parts, respectively, into engagement with said first and second members, said inner hub part and said outer hub part being constructed to cause the elastic deformation of said intermediate members in response to said radial contraction and expansion of said parts whereby forces are produced which tend to prevent the accident disassembly of said hub assembly that might otherwise result from vibration.

8. An expandable hub assembly according to claim 7 and including:

said inner hub part and said outer hub part each being of substantially annular construction.

* * * * *